H. COOK.
POTATO DIGGER.
APPLICATION FILED JAN. 12, 1909.
927,121.
Patented July 6, 1909.
2 SHEETS—SHEET 1.
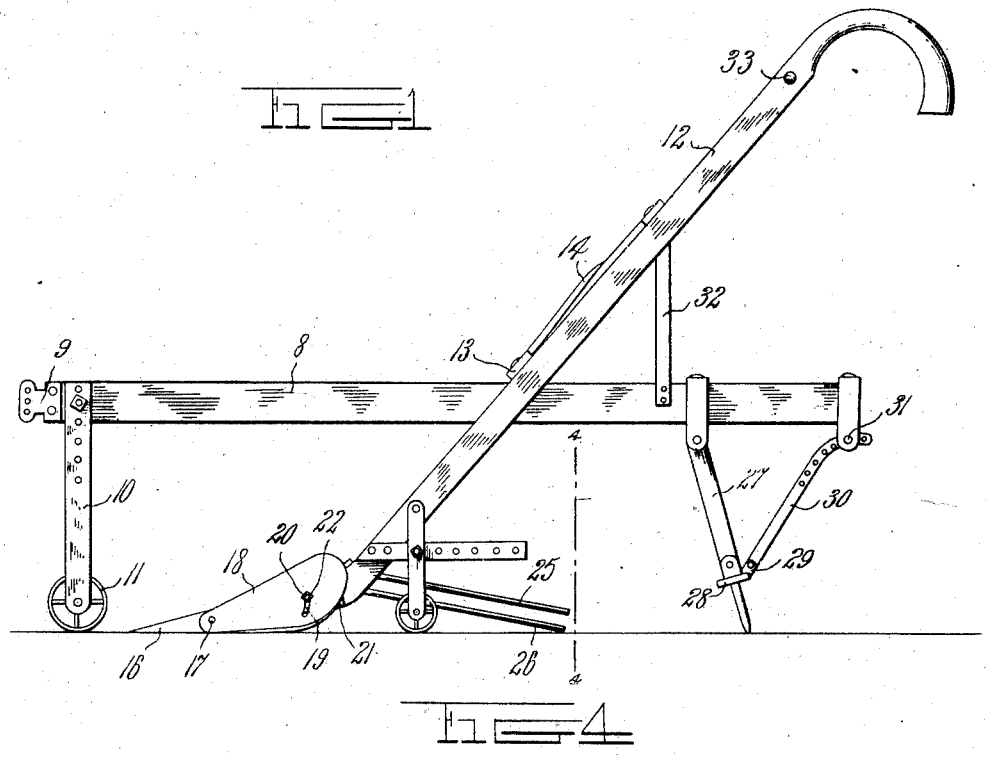
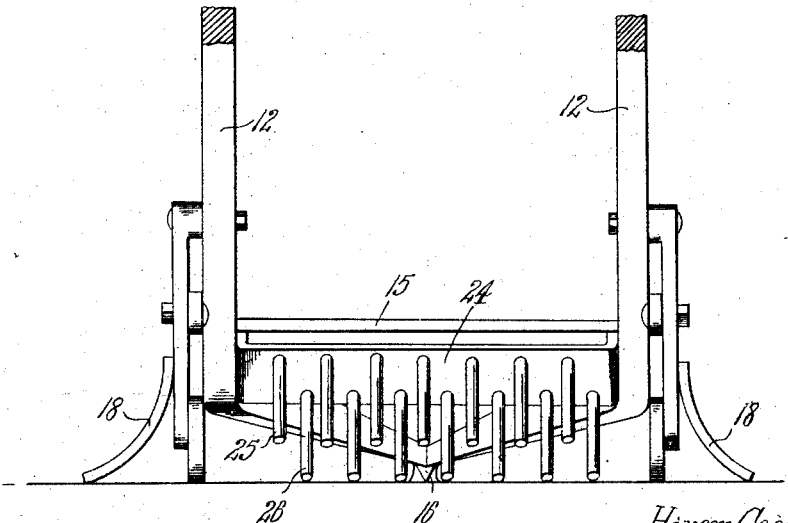
Witnesses
J. H. Crawford
Inventor
Hiram Cook
By
Attorneys H. COOK.
POTATO DIGGER.
APPLICATION FILED JAN. 12, 1909.
927,121.
Patented July 6, 1909.
2 SHEETS—SHEET 2.
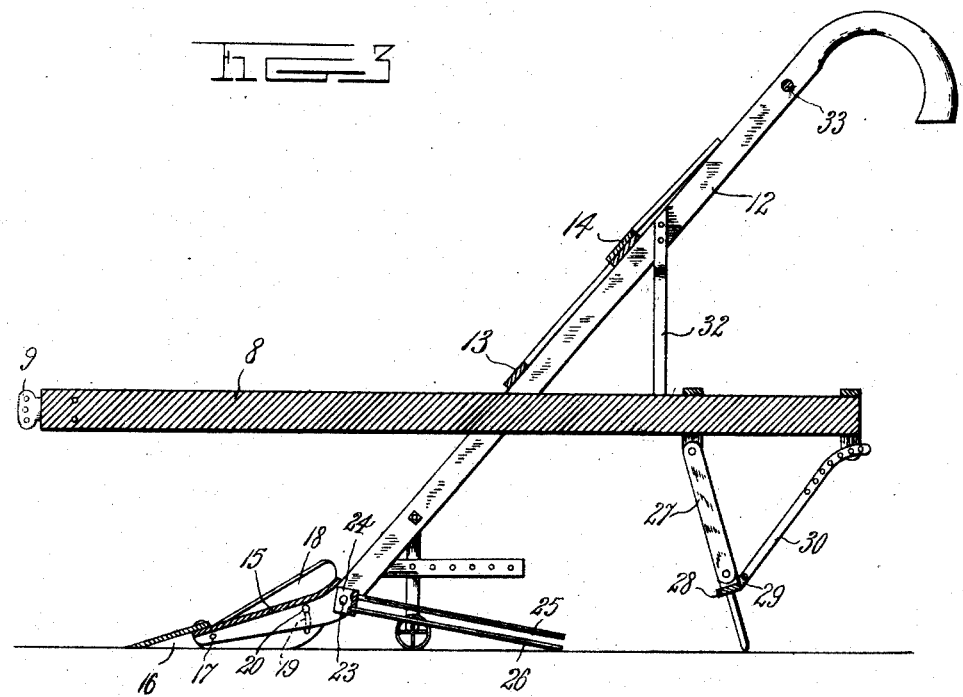
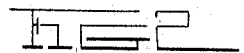
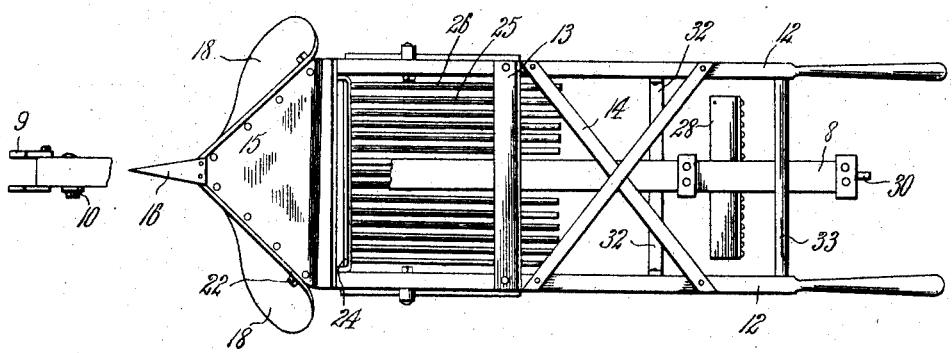
Witnesses
Inventor
Hiram Cook,
By
Attorneys

UNITED STATES PATENT OFFICE.

HIRAM COOK, OF VERONA, NEW JERSEY.

POTATO-DIGGER.

No. 927,121.  Specification of Letters Patent.  Patented July 6, 1909.

Application filed January 12, 1909. Serial No. 471,958.

*To all whom it may concern:*

Be it known that I, HIRAM COOK, a citizen of the United States, residing at Verona, in the county of Essex, State of New Jersey, have invented certain new and useful Improvements in Potato-Diggers; and I do hereby declare the following to be a full, clear, and exact description of the invention, such as will enable others skilled in the art to which it appertains to make and use the same.

The invention relates to a potato digger and more particularly to the class of potato diggers having means to separate dirt from the potatoes and rake means for leveling the broken dirt after the delivery of potatoes from the ground.

The primary object of the invention is the provision of a potato digger supporting a vertically adjustable ground wheel, a shovel in rear of said ground wheel and having a share to plow or cut into the earth, fenders or mold boards at opposite sides of the shovel and adapted to be angularly adjusted to regulate the depth of cut of the share mounted upon the shovel, catcher prongs projecting rearwardly from the shovel for subsequently catching or receiving vegetables such as potatoes delivered from the earth so as to separate weeds and earth from the potatoes, and rake means angularly adjustable on the rear end of the draft beam and disposed a distance behind the shovel to act upon the broken earth to crush and level the same so that the ground will be prepared to receive seed to permit the growth of a new crop.

Another object of the invention is the provision of a potato digger which is simple in construction, thorough and efficient in operation and inexpensive in the manufacture and which implement may be used for digging or delivering other vegetables from the earth, as the occasion may demand.

In the drawings accompanying and forming part of this specification is illustrated the preferred form of embodiment of the invention which to enable those skilled in the art to practice the invention will be set forth at length in the following description while the novelty of the invention will be brought out in the appended claims.

In the drawings: Figure 1 is a side elevation of the invention. Fig. 2 is a plan view. Fig. 3 is a vertical longitudinal sectional view. Fig. 4 is a rear elevation on the line 4—4 of Fig. 1.

Similar reference characters indicate corresponding parts throughout the several views in the drawings.

In the drawings, the numeral 8 designates the main beam or draft bar having fixed to its forward end a clevis 9 for the attachment of a whiffletree of the ordinary construction and to which are connected draft animals whereby the implement may be drawn across a field.

Directly in rear of the draft clevis 9 is a depending leg or bracket 10 the latter capable of vertical adjustment on the main beam and supporting a ground wheel 11 to guide and steady the forward travel of the implement. At opposite sides of the main beams 8 are parallel handle bars 12 the same being inclined with respect to the ground and having their lower ends slightly converging toward each other and which handle bars are united by a cross piece 13 and to more rigidly secure the said handle bars in spaced relation to each other there are provided diagonal cross pieces or braces 14 the outer ends of which are connected to the handle bars.

To the lower ends of the handle bars 12 is bolted a metal plate forming a shovel 15 upon which is adjustably mounted a share point 16 of the usual construction. Connected by pivots 17 to the shovel 15 are fenders or mold boards 18 the latter containing curved slots 19 through which project studs 20 formed on reinforcing metal strips 21 secured to the outer faces of the handle bars and which studs 20 have threaded thereon lock nuts 22 to hold the fenders or mold boards in various adjusted positions so as to increase or decrease the depth of cut of the shovel 15 of the implement.

Beneath the shovel 15 and swiveled by bolt fasteners 23 to the handle bars 12 near their lower ends is a cross bar 24 which latter has connected thereto upper and lower rows of catcher prongs 25 and 26 respectively which prongs 26 are adapted to contact with the ground during the travel of the implement and upon which prongs are caught potatoes which are delivered from the ground by the shovel 15 where they are severely shaken due to the irregularity of the ground to separate weeds and clods of earth therefrom as the implement advances over a field.

Near the rear end of the main beam 8 is fixed a depending arm 27 to the lower end of which is pivotally connected a toothed rake head 28 which latter has formed thereon a perforated extension and ear 29 to which is pivotally connected the inner end of an adjusting lever 30 which latter is held securely locked in its adjusted position by a locking member 31 fixed to the rear end of the main beam. It is obvious the toothed rake head 28 is capable of being angularly adjusted so as to have its teeth effect a heavy or light raking action upon the broken earth to crush or pulverize and level the same during the forward travel or advancement of the implement and thus prepare the soil for the subsequent planting of a new crop.

Rising from the rear end of the main beam 8 are brace rods 32 which latter are connected to the handle bars 12 so as to rigidly hold the latter inclined with respect to the ground. Also connected to the handle extremities of the handle bars 12 is a rung 33 which prevents the bars from spreading with respect to each other during the heavy use of the implement.

What is claimed is—

1. An implement of the class described comprising a wheeled main beam, handle bars disposed at opposite sides of the main beam and secured thereto, a shovel fixed to the lower end of said handle bars and disposed at an inclination with respect to the ground, a share point carried by said shovel, fenders vertically adjustable and mounted at opposite sides of the shovel, superposed rows of catcher prongs swiveled beneath said shovel and projecting rearwardly therefrom and an angularly adjustable rake head carried by said main beam and arranged in rear of the shovel.

2. An implement of the class described comprising a main beam, a vertically adjustable ground wheel supported at the forward end of said main beam, a shovel arranged in rear of said ground wheel, handle bars rising from said shovel and having connection with the main beam, fenders pivotally connected at opposite sides of the shovel, means permitting vertical adjustment of the fenders, and rake means arranged in rear of the shovel.

3. An implement of the class described comprising a main beam, a vertically adjustable ground wheel supported at the forward end of said main beam, a shovel arranged in rear of said ground wheel, handle bars rising from said shovel and having connection with the main beam, fenders pivotally connected at opposite sides of the shovel, means permitting vertical adjustment of the fenders, rake means arranged in rear of the shovel, and catcher prongs swiveled in rear of said shovel and beneath the same.

4. An implement of the class described comprising a main beam, a vertically adjustable ground wheel carried at the forward end thereof, a shovel in rear of said ground wheel, a share point adjustable on said shovel, vertically adjustable fenders mounted at opposite sides of the shovel, handle bars rising from said shovel and rigidly connected to the main beam, a catcher member swiveled to the lower ends of the handle bars beneath the shovel and having superposed rows of prongs projecting rearwardly of the shovel, and rake means mounted on the rear end of the main beam and angularly adjustable with respect to the ground.

In testimony whereof, I affix my signature, in presence of two witnesses.

HIRAM COOK.

Witnesses:
BRITTON C. SYM,
JOHN CRAMER.